United States Patent
Harrington

(10) Patent No.: US 8,515,257 B2
(45) Date of Patent: Aug. 20, 2013

(54) AUTOMATIC ANNOUNCER VOICE ATTENUATION IN A PRESENTATION OF A TELEVISED SPORTING EVENT

(75) Inventor: Nathan J. Harrington, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1707 days.

(21) Appl. No.: 11/874,023

(22) Filed: Oct. 17, 2007

(65) Prior Publication Data

US 2009/0103896 A1 Apr. 23, 2009

(51) Int. Cl.

| | |
|---|---|
| G11B 27/00 | (2006.01) |
| H04N 5/93 | (2006.01) |
| H04N 9/80 | (2006.01) |
| H04B 15/00 | (2006.01) |
| H04B 1/20 | (2006.01) |
| H03G 5/00 | (2006.01) |
| H03G 9/00 | (2006.01) |
| H03G 3/00 | (2006.01) |

(52) U.S. Cl.
USPC .......... 386/285; 386/239; 386/278; 381/94.1; 381/101; 381/102; 381/104; 369/1; 369/4

(58) Field of Classification Search
USPC ......... 386/239–262, 285, 291–299, 337–340; 369/1–12; 381/1–28, 94.1–94.3, 99–109
See application file for complete search history.

(56) References Cited

U.S. PATENT DOCUMENTS

| | | | |
|---|---|---|---|
| 4,602,279 A | 7/1986 | Freeman | |
| 5,585,858 A | 12/1996 | Harper et al. | |
| 5,714,997 A | 2/1998 | Anderson | |
| 5,867,815 A * | 2/1999 | Kondo et al. | 704/228 |
| 6,510,279 B1 * | 1/2003 | Morishita | 386/203 |
| 6,697,564 B1 * | 2/2004 | Toklu et al. | 386/285 |
| 6,819,863 B2 * | 11/2004 | Dagtas et al. | 386/249 |
| 7,260,306 B2 * | 8/2007 | Murata et al. | 386/282 |
| 7,336,890 B2 * | 2/2008 | Lu et al. | 386/239 |
| 7,415,120 B1 * | 8/2008 | Vaudrey et al. | 381/109 |
| 7,711,123 B2 * | 5/2010 | Crockett | 381/56 |
| 2002/0022898 A1 * | 2/2002 | Araki | 700/94 |
| 2003/0125933 A1 * | 7/2003 | Saunders et al. | 704/201 |
| 2003/0147390 A1 | 8/2003 | Rizzo et al. | |
| 2003/0231775 A1 * | 12/2003 | Wark | 381/56 |
| 2004/0196989 A1 * | 10/2004 | Friedman et al. | 381/119 |
| 2006/0165312 A1 * | 7/2006 | Odell | 382/291 |
| 2007/0101249 A1 * | 5/2007 | Lee et al. | 715/500.1 |
| 2008/0101626 A1 * | 5/2008 | Samadani | 381/94.3 |

* cited by examiner

*Primary Examiner* — Hung Dang
(74) *Attorney, Agent, or Firm* — Yudell Isidore Ng Russell PLLC

(57) ABSTRACT

A method of automatic announcer voice removal from a televised sporting event. A sound processing circuit divides an audio input signal of a televised sporting event into multiple audio segments. The audio input signal includes crowd noise and announcer commentary. If an audio segment does not exceed a pre-defined amplitude threshold, a voice removal utility adds the audio segment to a recent crowd noise library and stores the segment in an output buffer. If the amplitude of a segment exceeds the threshold, the utility adds the segment to a recent announcer voice library. The sound processing circuit generates an attenuated version of the segment and blends the attenuated version with one or more mixed segments from the recent crowd noise library. The voice removal utility stores the attenuated and blended segment in the output buffer and outputs one or more audio segments from the buffer in a chronological order.

19 Claims, 4 Drawing Sheets

AUTOMATIC ANNOUNCER VOICE ATTENUATION IN A PRESENTATION OF A TELEVISED SPORTING EVENT

BACKGROUND OF THE INVENTION

1. Technical Field

The present invention relates in general to television and in particular to television audio signals. Still more particularly, the present invention relates to an improved method and system for automatic announcer voice removal from a televised sporting event.

2. Description of the Related Art

Televised sporting events include an audio signal, which in turn typically includes live action sounds (e.g., crowd noise and sounds from the game) and announcer commentary. An announcer's voice and/or comments may be distracting to some members of a television audience. Consequently, television viewers may wish to listen only to the crowd noise and sounds of a game while not hearing the announcer commentary.

Conventional methods of removing announcer commentary from televised sporting events include separating the audio signal into different components (e.g., voice and remaining audio), transmitting the audio components separately, and subsequently recombining the audio components at the viewing location based on the preferences of the viewer. Other methods of removing announcer commentary include relying upon the center channel of a surround sound mixed recording to include only the voice component of an audio signal and selectively filtering the center channel using inverse phase attenuation. Conventional methods of removing announcer commentary thus require specialized recording methods and/or the separate transmittal of audio data components.

SUMMARY OF AN EMBODIMENT

Disclosed are a method, system, and computer storage medium for automatic announcer voice removal from a televised sporting event. A sound processing circuit divides an audio input signal of a televised sporting event into multiple audio segments. The audio input signal includes crowd noise and announcer commentary. If an audio segment does not exceed a pre-defined amplitude threshold, a voice removal utility adds the audio segment to a recent crowd noise library and stores the segment in an output buffer. If the amplitude of a segment exceeds the threshold, the voice removal utility adds the segment to a recent announcer voice library. The sound processing circuit generates an attenuated version of the segment and blends the attenuated version with one or more mixed segments from the recent crowd noise library. The voice removal utility stores the attenuated and blended segment in the output buffer and outputs one or more audio segments from the output buffer in a chronological order with respect to the audio input signal.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system, and computer storage medium for automatic announcer voice removal from a televised sporting event.

Figure 1:
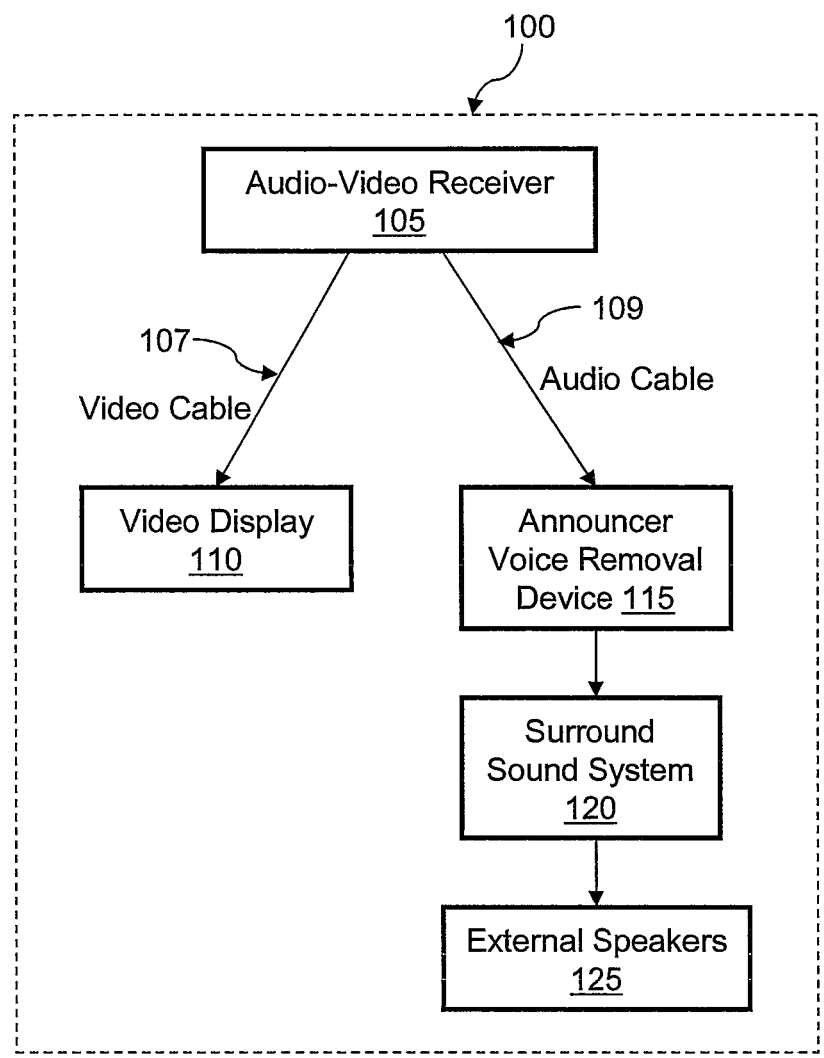
FIG. 1 depicts a high level block diagram of an exemplary announcer voice removal device in a home theater system, according to an embodiment of the present invention.

With reference now to FIG. 1, there is depicted a high level schematic diagram of an exemplary announcer voice removal device in a home theater system, according to an embodiment of the present invention. As shown, home theater system 100 includes an audio-video (AV) receiver 105. As utilized herein, an AV receiver refers to a device, such as a satellite receiver, television antenna, or cable box that receives television signals and provides corresponding video and audio signals to one or more components of an entertainment system. Home theater system 100 includes a video display 110 (e.g., a television or video monitor) that is connected to AV receiver 105 via one or more video cables 107.

In one embodiment, home theater system 100 includes an announcer voice removal device 115, which is connected to AV receiver 105 via one or more audio cables 109. Announcer voice removal device 115 is coupled to a surround sound system 120, which is in turn connected to one or more external speakers 125. As utilized herein, a surround sound system refers to an exemplary audio system that includes one or more external speakers that are not included in a video display device. Surround sound system 120 may include an audio tuner, a surround sound remote control, and/or an audio amplifier (not illustrated). Announcer voice removal device 115 performs the functions illustrated in FIG. 4, which is discussed below. Although illustrated as a component of home theater system 100, announcer voice removal device 115 may be included in a non-residential entertainment system, such as a restaurant or sports bar, that includes multiple video displays 110.

Figure 2:
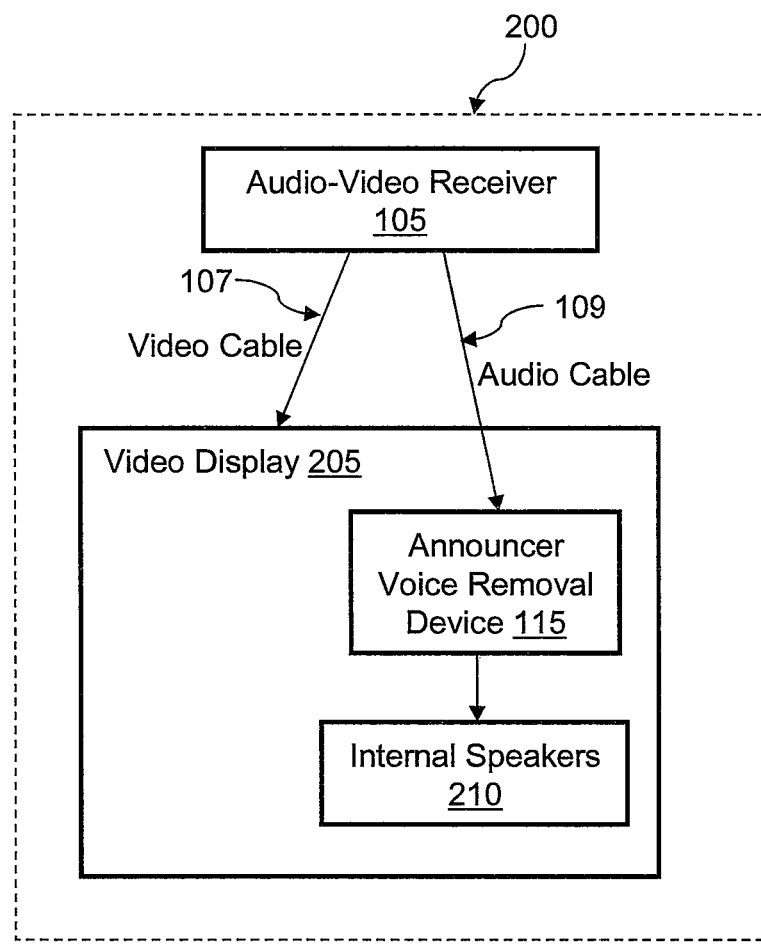
FIG. 2 depicts a high level block diagram of an exemplary announcer voice removal device integrated within a video display, according to another embodiment of the present invention.
Figure 4:
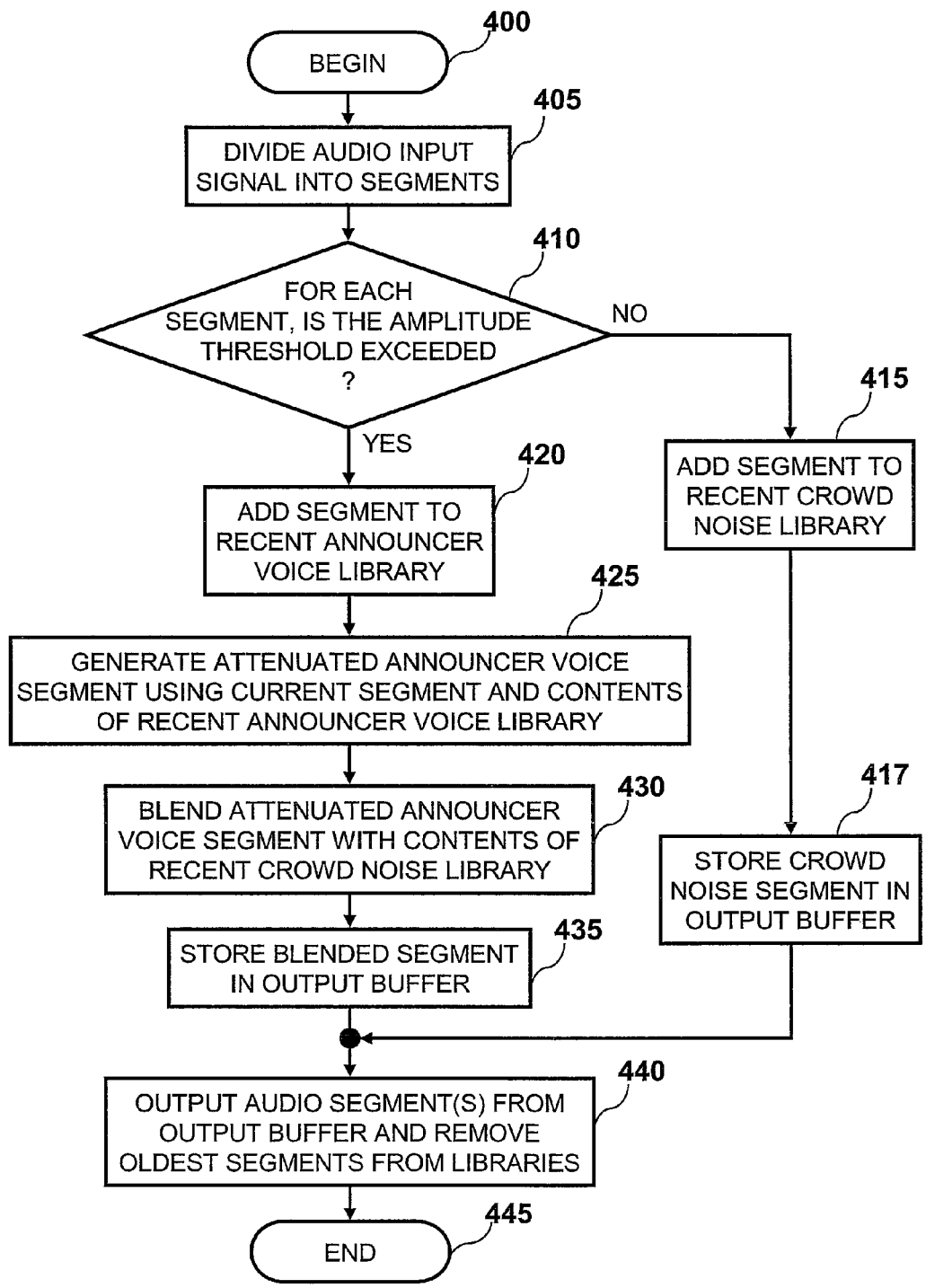
FIG. 4 is a high level logical flowchart of an exemplary method of automatic announcer voice removal from a televised sporting event, according to an embodiment of the invention.

With reference now to FIG. 2, there is depicted a high level block diagram of an exemplary announcer voice removal device integrated within a video display, according to another embodiment of the present invention. As shown, home theater system 200 includes a video display 205 (e.g., a television) that includes an integrated announcer voice removal device 115 and one or more internal speakers 210. Video display 205 is connected to AV receiver 105 via one or more video cables 107. Similarly, announcer voice removal device 115 is connected to AV receiver 105 via one or more audio cables 109. Announcer voice removal device 115 is also coupled to internal speakers 210. Whether announcer voice removal device 115 is integrated within video display 205 of home theater system 200 or included as a separate component within home theater system 100 (FIG. 2), announcer voice removal device 115 is configured similarly and performs the same functions, as illustrated in FIG. 4, which is described below.

Figure 3:
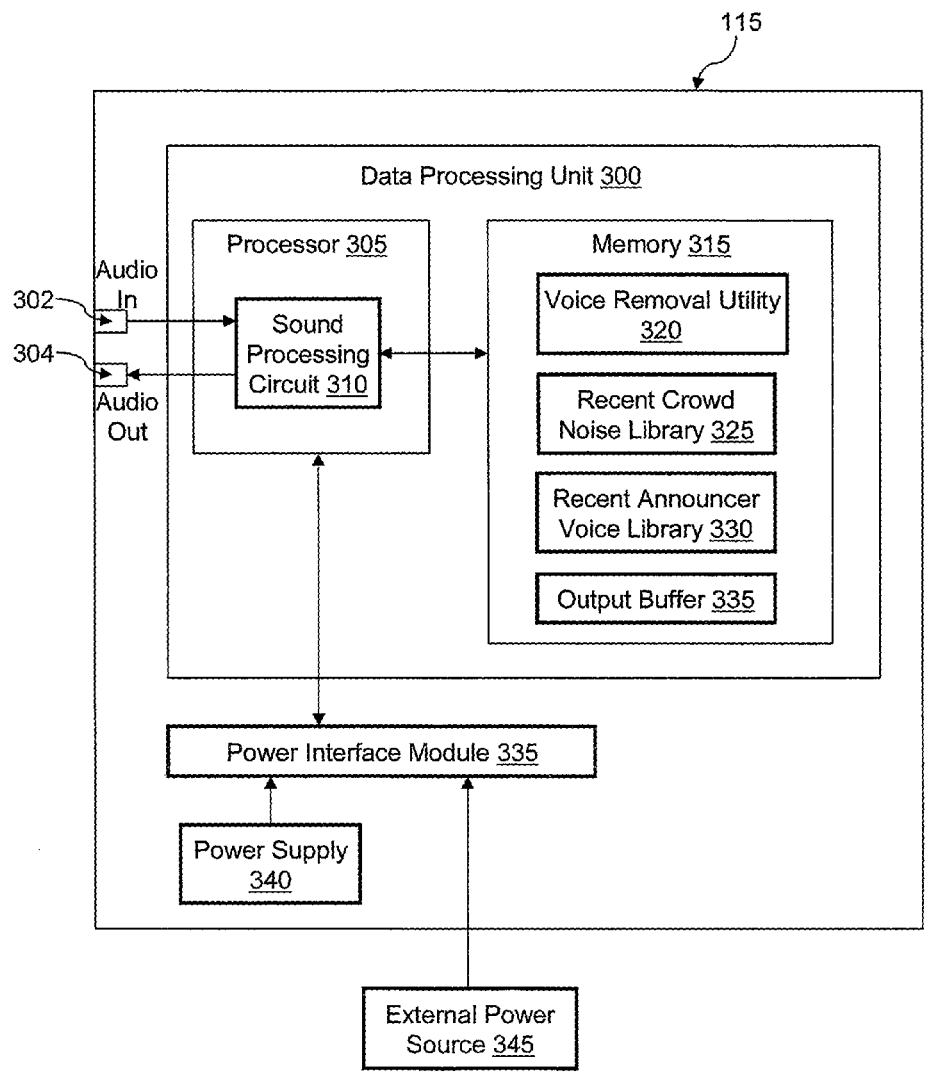
FIG. 3 illustrates a high level schematic diagram of the announcer voice removal device of FIGS. 1 and 2, according to an embodiment of the present invention.

With reference now to FIG. 3, there is depicted a high level schematic diagram of announcer voice removal device 115 (FIGS. 1 and 2), according to an embodiment of the present invention. As shown, announcer voice removal device 115 includes an embedded data processing unit 300, an audio input connector 302, an audio output connector 304, a power interface module 335, and a power supply 340 (e.g., an AC/DC converter or a battery), which is coupled to power interface module 335. In one embodiment, power interface module 335 may be connected to an external power source 345 (e.g., an electrical "wall outlet"). Audio input connector 302 enables announcer voice removal device 115 to receive one or more audio input signals from AV receiver 105 (FIGS. 1 and 2) via one or more audio cables 109. Similarly, audio output connector 304 enables announcer voice removal device 115 to provide one or more audio output signals to an audio device, such as surround sound system 120 (FIG. 1) or internal speakers 210 (FIG. 2).

According to the illustrative embodiment, data processing unit 300 includes a processor 305 and a memory 315. In one embodiment, data processing unit 300 may be an embedded computer. Processor 305 includes sound processing circuit 310, which performs multiple sound processing functions, including but not limited to, a simple audio mixing function, a "noise gate" function, and a "Hann Window" function. As utilized herein, a "noise gate" function refers to a function performed by a circuit that "passes" (i.e., selectively directs) an audio signal if the amplitude of the audio signal exceeds a pre-defined threshold level. A "Hann Window" function refers to a signal processing window function (i.e., an "apodization" function) that provides an output value of zero when an input value is outside a pre-defined interval (i.e., the output is equal to zero outside the window). A Hann Window is a "raised cosine" window suitable for narrowband applications. A Hann Window may be defined by the following function:

$$\text{Hanning}(k) = \alpha - (1-\alpha) * \cos(2\pi k/N), \text{where } \alpha \text{ is a constant and } k = \{0, 1, \ldots, N-1\}.$$

According to the illustrative embodiment, memory 315 includes a voice removal utility 320 that performs the functions illustrated in FIG. 4, which is described below. Memory 315 also includes a recent crowd noise library 325, a recent announcer voice library 330, and an output buffer 335. Recent crowd noise library 325 includes a simple mixed combination of the crowd noise from the audio signal of a televised sporting event for a pre-defined time period. In one embodiment, recent crowd noise library 325 includes a mixed combination of the most recent 0.5 seconds of crowd noise. As utilized herein, crowd noise refers to audio signals that include noise from the crowd, the players, and/or the background during a televised sporting event (i.e., the sounds of the game). Recent announcer voice library 330 includes multiple segments of audio commentary of a sports announcer of a televised sporting event for a pre-defined time period. In one embodiment, recent announcer voice library 330 may include up to the most recent 10 seconds of "announcer voice" audio segments. Output buffer 335 includes one or more processed audio segments that are ready to be output from announcer voice removal device 115 to an audio device, such as surround sound system 120 (FIG. 1) or internal speakers 210 (FIG. 2).

Turning now to FIG. 4, there is illustrated a high level logical flowchart of an exemplary method of automatic announcer voice removal from a televised sporting event, according to an embodiment of the invention. The process begins at block 400 in response to announcer voice removal device 115 (FIGS. 1-3) receiving an audio input signal. Voice removal utility 320 (FIG. 3) uses sound processing circuit 310 to divide the audio input signal into multiple audio segments of a pre-defined length, as depicted in block 405. In one embodiment, sound processing circuit 310 automatically divides the audio input signal into 0.25 second audio segments. In an alternate embodiment, voice removal utility 320 may dynamically adjust the length of the audio segments based on the length of the audio input signal and/or the performance (i.e., output signal quality) of sound processing circuit 310. In another embodiment, voice removal utility 320 may adjust the length of the audio segments based on input from a user of announcer voice removal device 115.

At block 410, sound processing circuit 310 uses a noise gate function to determine whether or not the amplitude of each audio segment of the incoming audio signal exceeds a pre-defined amplitude threshold level. The audio signal of a televised sporting event is typically broadcast and/or transmitted with the announcer commentary mixed with a higher gain than the crowd noise. Audio segments corresponding to an announcer's voice will thus exceed the amplitude threshold and "pass" the noise gate circuit within sound processing circuit 310.

If the amplitude of an audio segment does not exceed the amplitude threshold (i.e., the audio segment corresponds to crowd noise), voice removal utility 320 adds the audio segment to recent crowd noise library 325 by using a simple mixing function of sound processing circuit 310 to blend the audio segment together with the recent crowd noise segments in crowd noise library 325, as shown in block 415. In one embodiment the simple mixing function is defined as a function that blends two input waveforms together to produce a single output waveform having a maximum amplitude less than or equal to the maximum amplitudes of either of the two input waveforms. Voice removal utility 320 also stores the current crowd noise segment in output buffer 335 (FIG. 3), as depicted in block 417, and the process proceeds to block 440.

In one embodiment, recent crowd noise library 325 includes a simple mixed combination of the most recent 0.5 second of crowd noise audio segments. Since the audio signature (i.e., character) of crowd noise can change over time in volume and/or timbre (e.g., in response to events occurring on the playing field), storing the most recent 0.5 seconds of crowd noise in recent crowd noise library 325 enables voice removal utility 320 to provide a more realistic crowd noise blending during the announcer voice removal process, as illustrated in block 430, which is described below.

If the amplitude of an audio segment exceeds the amplitude threshold (i.e., the audio segment corresponds to announcer commentary), voice removal utility 320 adds the audio segment to recent announcer voice library 330, as depicted in block 420. In one embodiment, recent announcer voice library 330 includes up to 10 seconds of the most recent announcer voice audio segments. Voice removal utility 320 generates an attenuated (i.e., diminished) announcer voice segment by using the audio segment that exceeded the amplitude threshold as a first input to a Hann Window function of sound processing circuit 310 and the combination of the contents of recent announcer voice library 330 as a second input to the Hann Window function, as shown in block 425. The output of the Hann Window function includes an attenuated version of the current announcer voice segment.

At block 430, voice removal utility 320 further reduces the signature of the announcer's voice by using a simple mixing function of sound processing circuit 310 to blend the attenuated version of the current announcer voice segment (i.e., the output of the Hann Window function) with a mixed combination of the contents of recent crowd noise library 325 (e.g., the last 0.5 seconds of crowd noise). Voice removal utility 320 temporarily stores the output of the simple mixing function (i.e., the attenuated announcer voice segment blended with recent crowd noise) in output buffer 335 (FIG. 3), as depicted in block 435.

At block 440, voice removal utility 320 outputs one or more audio segments in chronological order from output buffer 335 to one or more audio devices coupled to audio output connector 304 (FIG. 3), and voice removal utility 320 removes the "oldest" audio segments from recent crowd noise library 325 and/or recent announcer voice library 330. The process subsequently terminates at block 445. The one or more audio segments output from announcer voice removal device 115 in chronological order with respect to the original audio input signal thus include attenuated announcer voice segments blended with temporally "nearby" crowd noise events and/or original crowd noise segments.

In one embodiment, the "oldest" audio segments within recent crowd noise library 325 are defined as crowd noise segments that were received more than 0.5 seconds after the most recently received audio segment, and the "oldest" audio segments within recent announcer voice library 330 are defined as announcer voice segments that were received more than 10 seconds after the most recently received announcer voice segment. In another embodiment, voice removal utility 320 may automatically delete the oldest audio segment from a particular library that is "full" (e.g., if recent crowd noise library 325 includes 0.5 seconds of segments and/or if recent announcer voice library 330 includes 10 seconds of segments) when a new audio segment is added to the "full" library.

The present invention thus provides a method of automatic announcer voice removal from a televised sporting event without specialized recording methods or separate transmittal of audio data components. Sound processing circuit 310 (FIG. 3) divides an audio input signal of a televised sporting event into multiple audio segments. The audio input signal includes crowd noise and announcer commentary. If an audio segment does not exceed a pre-defined amplitude threshold, voice removal utility 320 (FIG. 3) adds the audio segment to recent crowd noise library 325 (FIG. 3) and stores the segment in output buffer 335 (FIG. 3). If the amplitude of a segment exceeds the threshold, voice removal utility 320 adds the segment to recent announcer voice library 330 (FIG. 3). Sound processing circuit 310 generates an attenuated version of the segment and blends the attenuated version with one or more mixed segments from recent crowd noise library 325. Voice removal utility 320 stores the attenuated and blended segment in output buffer 335 and outputs one or more audio segments from output buffer 335 in a chronological order with respect to the audio input signal.

It is understood that the use herein of specific names are for example only and not meant to imply any limitations on the invention. The invention may thus be implemented with different nomenclature/terminology and associated functionality utilized to describe the above devices/utility, etc., without limitation.

In the flow chart (FIG. 4) above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

While an illustrative embodiment of the present invention has been described in the context of a fully functional data processing system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. In a computer system, a method comprising:
dividing an audio input signal corresponding to a televised sporting event into a temporally sequential plurality of audio segments, wherein at least some of the plurality of audio segments include both crowd noise and announcer commentary, and wherein said announcer commentary has a greater amplitude than said crowd noise in multiple of the plurality of audio segments;
in response to a determination that an amplitude of an audio segment from the plurality of audio segments does not exceed a pre-defined amplitude threshold:
adding said audio segment to a recent crowd noise library, and
storing said audio segment in an output buffer;
in response to a determination that said amplitude of said audio segment exceeds said pre-defined amplitude threshold:
adding said audio segment to a recent announcer voice library,
generating an attenuated version of said audio segment,
blending said attenuated version of said audio segment with one or more mixed audio segments included in said recent crowd noise library, and
storing said attenuated version of said audio segment blended with said one or more mixed audio segments in said output buffer; and
outputting one or more audio output segments from said output buffer in a chronological order with respect to said audio input signal.

2. The method of claim 1, wherein said computer system is embedded within a video display device.

3. The method of claim 1, wherein said computer system further comprises a standalone unit connected to an external audio amplification device.

4. The method of claim 1, wherein said plurality of audio segments are each 0.25 seconds in length.

5. The method of claim 1, wherein said recent crowd noise library further comprises a mixed combination of up to a most recent 0.5 seconds of said crowd noise.

6. The method of claim 1, wherein said recent crowd noise library further comprises up to a most recent 10 seconds of said announcer commentary.

7. The method of claim 1, wherein generating said attenuated version of said audio segment further comprises providing said audio segment and said one or more mixed audio segments included in said recent crowd noise library as inputs to a Hann Window function.

8. A computer system comprising:
an audio input connector coupled to an audio-video receiver that provides an audio input signal that corresponds to a televised sporting event;
an audio output connector;
a processor coupled to said audio input connector and said audio output connector, wherein said processor includes a sound processing circuit, and wherein said sound processing circuit divides said audio input signal into a temporally sequential plurality of audio segments, wherein at least some of the plurality of audio segments include both crowd noise and announcer commentary, and wherein said announcer commentary has a greater amplitude than said crowd noise in multiple of the audio segments;
a memory coupled to said processor, wherein said memory includes:
a recent crowd noise library,
a recent announcer voice library,
an output buffer, and
a voice removal utility that provides the functions of:
in response to a determination that an amplitude of an audio segment from the plurality of audio segments does not exceed a pre-defined amplitude threshold:
adding said audio segment to said recent crowd noise library, and
storing said audio segment in said output buffer;
in response to a determination that said amplitude of said audio segment exceeds said pre-defined amplitude threshold:
adding said audio segment to said recent announcer voice library,
generating an attenuated version of said audio segment,
blending said attenuated version of said audio segment with one or more mixed audio segments included in said recent crowd noise library, and
storing said attenuated version of said audio segment blended with said one or more mixed audio segments in said output buffer; and
outputting one or more audio output segments from said output buffer in a chronological order with respect to said audio input signal.

9. The computer system of claim 8, wherein said computer system is embedded within a video display device.

10. The computer system of claim 8, wherein said computer system further comprises a standalone unit connected to an external audio amplification device.

11. The computer system of claim 8, wherein said plurality of audio segments are each 0.25 seconds in length.

12. The computer system of claim 8, wherein said recent crowd noise library further comprises a mixed combination of up to a most recent 0.5 seconds of said crowd noise.

13. The computer system of claim 8, wherein said recent crowd noise library further comprises up to a most recent 10 seconds of said announcer commentary.

14. The computer system of claim 8, wherein generating said attenuated version of said audio segment further comprises providing said audio segment and said one or more mixed audio segments included in said recent crowd noise library as inputs to a Hann Window function of said sound processing circuit.

15. A tangible computer storage medium encoded with a computer program that, when executed, performs:
dividing an audio input signal corresponding to a televised sporting event into a temporally sequential plurality of audio segments, wherein at least some of the plurality of audio segments include both crowd noise and announcer commentary, and wherein said announcer commentary has a greater amplitude than said crowd noise in multiple of the plurality of audio segments;
in response to a determination that an amplitude of an audio segment from the plurality of audio segments does not exceed a pre-defined amplitude threshold:
adding said audio segment to a recent crowd noise library, and
storing said audio segment in an output buffer;
in response to a determination that said amplitude of said audio segment exceeds said pre-defined amplitude threshold:
adding said audio segment to a recent announcer voice library,
generating an attenuated version of said audio segment,
blending said attenuated version of said audio segment with one or more mixed audio segments included in said recent crowd noise library, and
storing said attenuated version of said audio segment blended with said one or more mixed audio segments in said output buffer; and
outputting one or more audio output segments from said output buffer in a chronological order with respect to said audio input signal.

16. The computer storage medium of claim 15, wherein dividing said audio input signal into said plurality of audio segments comprises dividing said audio input signal into segments 0.25 seconds in length.

17. The computer storage medium of claim 15, wherein adding said audio segment to said recent crowd noise library further comprises adding said audio segment to said crowd noise library such that the crowd noise library holds a mixed combination of up to a most recent 0.5 seconds of said crowd noise.

18. The computer storage medium of claim 15, wherein said adding the audio segment to said recent crowd noise library further comprises adding the audio segment to the recent crowd noise library such that the crowd noise library holds up to a most recent 10 seconds of said announcer commentary.

19. The computer storage medium of claim 15, wherein generating said attenuated version of said audio segment includes providing said audio segment and said one or more mixed audio segments included in said recent crowd noise library as inputs to a Hann Window function.

* * * * *